HYDE & ANDREWS.
King Bolt.
No. 113,521.  Patented Apr. 11, 1871.
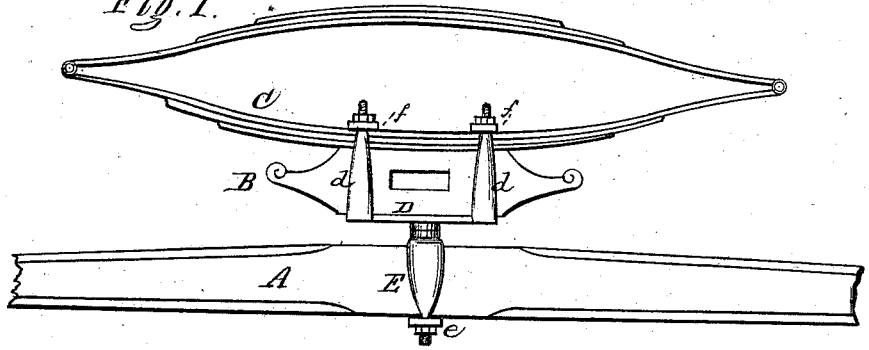
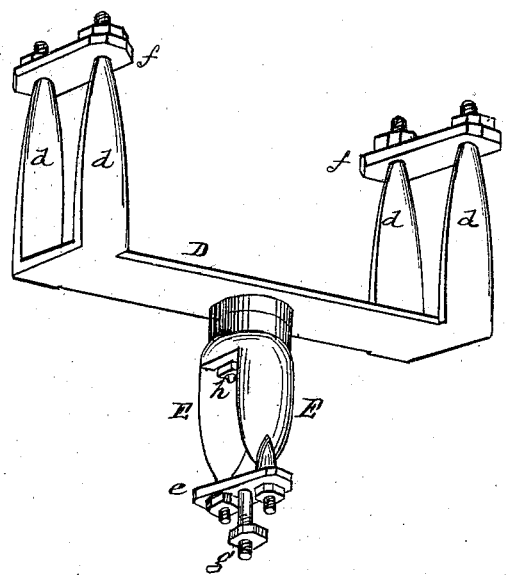
Witnesses.
Jerome S. Moseley
C. D. Van Allen
Inventor.
D. Hyde
E. H. Andrews
per S. A. Moseley
Atty.

United States Patent Office.

DWIGHT HYDE AND EPHRAIM H. ANDREWS, OF BRIDGEPORT, NEW YORK

Letters Patent No. 113,521, dated April 11, 1871.

IMPROVEMENT IN KING-BOLTS FOR CARRIAGES.

The Schedule referred to in these Letters Patent and making part of the same.

*To all whom it may concern:*

Be it known that we, DWIGHT HYDE and EPHRAIM H. ANDREWS, of Bridgeport, in the county of Madison and State of New York, have invented a new and improved King-Bolt for Carriages and other light vehicles; and we do hereby declare that the following is a full, clear, and exact description thereof, which will enable others to make and use the same, reference being had to the accompanying drawing forming a part of this specification, in which—

Figure 1 shows our invention in connection with the head-block and axle, and

Figure 2 shows the same separated from the other parts.

Similar letters of reference indicate like parts.

In the accompanying drawing—

A is the axle;
B is the head-block;
C is the spring; and
D d E is the king-bolt, which is made as follows:

Two clips, d, are united by a horizontal bar, D, as shown in fig. 2, and the bar D is pivoted at its center to a clip by a pivot, h. The lower clip E is clamped to the axle A, as shown in fig. 1, and the upper or double clip D d is clamped to the head-block B and over the lower part of the spring C, as shown, the upper and lower parts turning on each other by means of the center pivot h.

The forward end of the brace for the reach is secured to a pin, g, fig. 2, which projects from the plate e.

By this construction none of the parts are weakened by the bolts passing through them, as usually; and all the parts are clamped together and held in their positions without other fastenings.

Having thus described our invention,

What we claim as new, and desire to secure by Letters Patent, is—

An improved king-bolt, composed of the swiveled clip E h, which embraces the axle and the double clamp D d f, secured to the head-block and holding the spring, the clip E being provided with the plate and pin e g, and all the parts being constructed and arranged substantially as and for the purpose herein described.

The above specification of our invention signed by us this    day of January, 1871.

DWIGHT HYDE.
EPHRAIM H. ANDREWS.

Witnesses:
R. J. CLARK,
F. L. WEBB.